US010169358B2

(12) United States Patent
Araki et al.

(10) Patent No.: US 10,169,358 B2
(45) Date of Patent: Jan. 1, 2019

(54) DATA DEDUPLICATION USING A SMALL HASH TABLE

(71) Applicant: International Business Machines Corporation, Armonk, NY (US)

(72) Inventors: Hiroshi Araki, Kanagawa (JP); Tohru Hasegawa, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 596 days.

(21) Appl. No.: 14/878,225

(22) Filed: Oct. 8, 2015

(65) Prior Publication Data

US 2017/0103068 A1  Apr. 13, 2017

(51) Int. Cl.
*G06F 17/30* (2006.01)

(52) U.S. Cl.
CPC .............................. *G06F 17/3015* (2013.01)

(58) Field of Classification Search
CPC ........... G06F 17/3015; G06F 17/30159; G06F 3/0608; G06F 3/0641; G06F 17/30156; G06F 17/30097
USPC ........................................................ 707/692
See application file for complete search history.

(56) References Cited

U.S. PATENT DOCUMENTS

| 6,374,266 | B1 | 4/2002 | Shnelvar |
| 7,765,160 | B2 | 7/2010 | Niles et al. |
| 8,234,468 | B1 | 7/2012 | Deshmukh et al. |
| 8,682,869 | B2 | 3/2014 | Baldwin et al. |
| 8,751,763 | B1 | 6/2014 | Ramarao |
| 8,874,842 | B1* | 10/2014 | Kimmel ............... G06F 3/0611 711/100 |
| 2004/0083347 | A1* | 4/2004 | Parson .............. G06F 17/30949 711/165 |
| 2013/0339319 | A1 | 12/2013 | Woodward et al. |
| 2015/0019507 | A1 | 1/2015 | Aronovich |
| 2015/0154244 | A1 | 6/2015 | Haustein et al. |
| 2016/0012098 | A1* | 1/2016 | Li ....................... G06F 17/3033 707/692 |

OTHER PUBLICATIONS

Cassano, Chris, "A Comparison Study of Deduplication Implementations with Small-Scale Workloads", Honors Theses, Paper 117, 2012, pp. 1-18.

(Continued)

*Primary Examiner* — Evan Aspinwall
(74) *Attorney, Agent, or Firm* — Alexa L. Ashworth; Arnold B. Bangali

(57) ABSTRACT

Embodiments of the present invention provide methods, systems, and computer program products for data deduplication. In one embodiment, for a data chunk, it is determined whether a hash value of the data chunk generated by a first hash function is present in a hash table. Once a threshold size of the hash table is reached, it is determined whether there is free space in a write data area, identified by a second hash function. When there is no free space in the write data area, a post-deduplication process is performed for each data chunk in the write data area. Once free space is cleared in the write data area, the data chunk is written to the write data area identified by the second hash function.

15 Claims, 4 Drawing Sheets

(56) References Cited

OTHER PUBLICATIONS

Debnath et al., "ChunkStash: Speeding up Inline Storage Deduplication using Flash Memory", USENIXATC'10 Proceedings of the 2010 USENIX Conference on USENIX Annual Technical Conference, Jun. 23, 2010, pp. 1-16.

Krishnaprasad et al., "A Proposal for Improving Data DeDuplication with Dual Side Fixed Size Chunking Algorithm", 2013 Third International Conference on Advances in Computing and Communications, Aug. 29-31, 2013, pp. 13-16, IEEE.

* cited by examiner

DATA DEDUPLICATION USING A SMALL HASH TABLE

BACKGROUND OF THE INVENTION

The present invention relates generally to computer data processing systems, and more particularly to data duplication using a small hash table.

Data deduplication refers to the reduction and/or elimination of redundant data. The goal of a data deduplication system is often to store a single copy of duplicated data. In data deduplication, a data object, which may be a file, a data stream, or some other form of data, is broken down into one or more parts of a specific length called chunks or blocks, and the data chunks are grouped together with other data chunks containing matching content. In a typical data deduplication process, duplicate copies of data are reduced or eliminated, leaving a minimal amount of redundant copies, or a single copy of the data, respectively.

SUMMARY

Embodiments of the present invention provide methods, systems, and computer program products for data deduplication. In one embodiment, one or more computer processors, for a data chunk, determine whether a hash value of the data chunk generated by a first hash function is present in a hash table. One or more computer processors determine whether a size of the hash table is above a threshold size and in response to determining that the size of the hash table is above a threshold size, determine whether there is free space in a write data area, wherein the write data area is identified by a second hash function. One or more computer processors, in response to determining that there is not free space in the write data area, perform a post-deduplication process for each data chunk in the write data area and in response to determining that there is free space in the write data area, write the data chunk to the write data area identified by the second hash function.

DETAILED DESCRIPTION

As the amount of data to store increases, the amount of memory needed to store the data increases as well. The technique of data deduplication may be used in the area of data storage, in order to reduce the storage usage by grouping together data chunks of similar contents. Data deduplication may be performed using a hash table, which generally becomes larger in proportion to the storage capacity. For example, a large capacity storage may have a storage capacity of 100 PB, a chunk size of 4 KB, and a hash value of its hash function of 16 B. In this example, the maximum number of chunks is approximately 25 T for 100 PB/4 KB. If deduplication is possible for 30% of the chunks, hash values for the remaining 70% of the chunks become necessary, and thus the size of the hash table is about 25 T×0.7×16 B, or 240 GB. Often, a hash table is loaded into the memory to increase the speed, however, in the case where a large hash table is used (i.e., 240 GB), the memory usage rate may become very large, slowing down the speed of processing. Embodiments of the present invention provide a system and method for data deduplication using a limited sized hash table, by performing a post-deduplication process for certain data chunks, in order to efficiently identify the data chunks which may be deduplicated.

Figure 1:
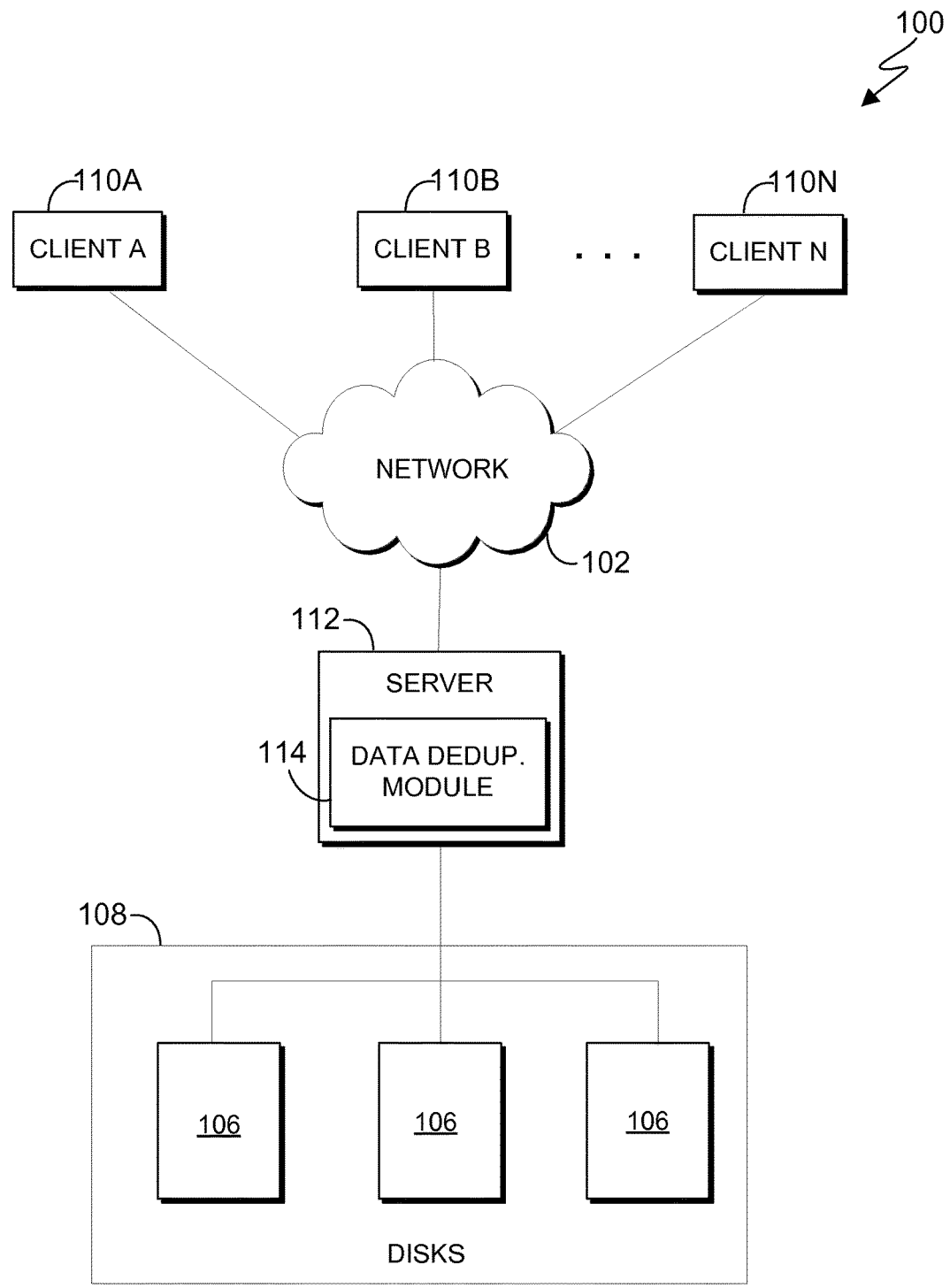
FIG. 1 depicts a block diagram illustrating a deduplication processing environment, in accordance with an embodiment of the present invention.

The present invention will now be described in detail with reference to the Figures. FIG. 1 depicts a block diagram illustrating an example environment, generally designated 100, for coordinating deduplication operations, in accordance with an embodiment of the present invention. Modifications to environment 100 may be made by those skilled in the art without departing from the scope of the invention as recited by the claims. In an exemplary embodiment, environment 100 includes network 102, an array of disks 108 which includes storage volume 106, clients 110A-N, and server 112, which includes data deduplication module 114.

Network 102 can be, for example, a local area network (LAN), a wide area network (WAN) such as the Internet, or a combination of the two, and can include wired, wireless, or fiber optic connections. Network 102 interconnects various clients 110A-N.

Clients 110A-N may be general-purpose computing devices, configured to execute applications, such as database applications. Clients 110A-N may request services from server 112 and may receive results of a service request from server 112.

Storage volume 106 may be a single, accessible storage area with a single file system, such as an accessible storage area on a hard disk, an optical disc, a tape drive, or generally any storage medium.

Server 112 is configured to control the storage of, and access to, data and an array of disks 108 which includes storage volume 106. In this embodiment, server 112 may also provide operations related to storage volume 106, such as backup operations and deduplication operations. In some embodiments, server 112 may also control storage of, and access to, one or more backup volumes.

In this exemplary embodiment, data deduplication module 114 uses a hash table to perform data deduplication. Data deduplication module 114 uses a hash function, h2( ), for determining the storage destination of a data chunk and uses a plurality of write data areas determined by the hash function.

Figure 2:
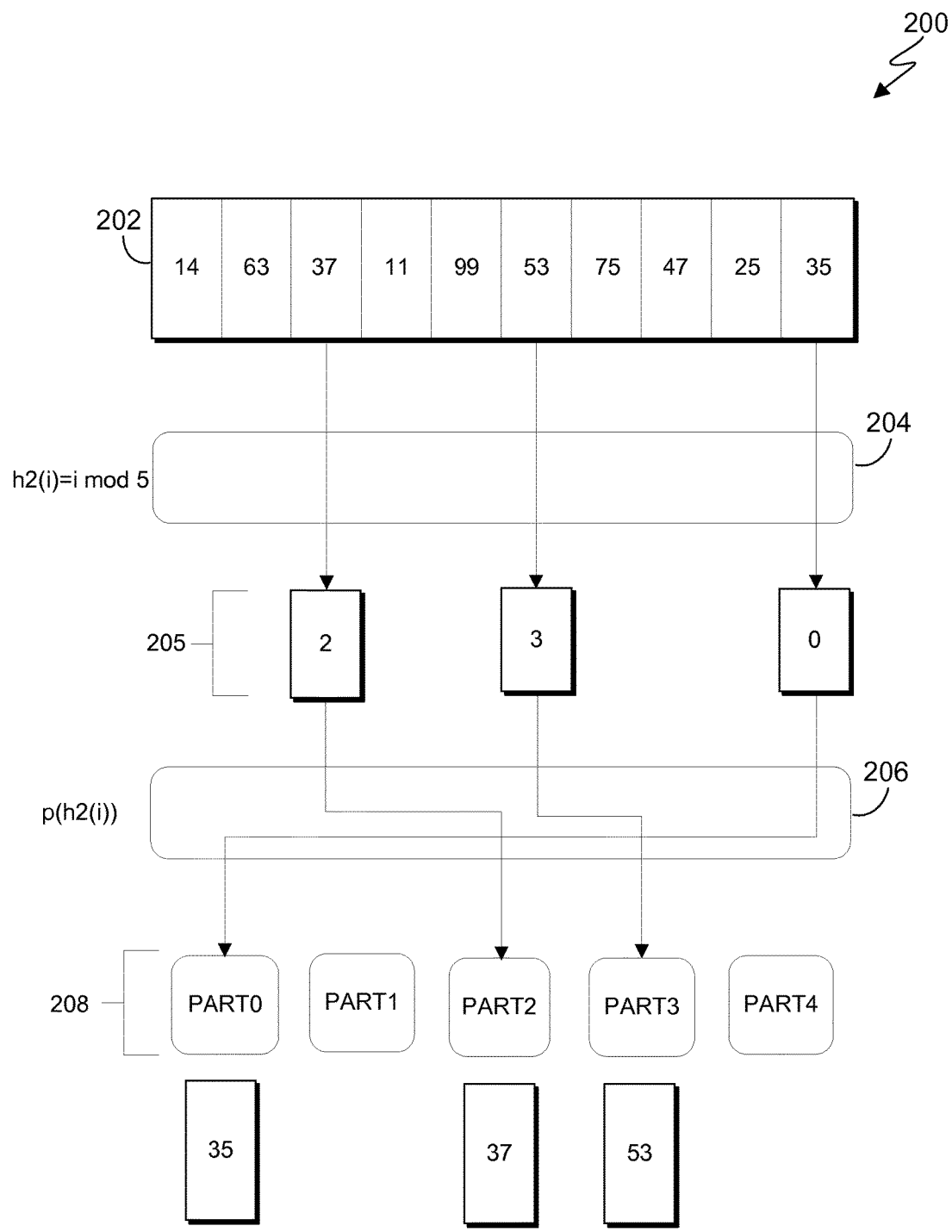
FIG. 2 is a functional block diagram depicting the relationship between the hash function for determining the storage location of a chunk of data, and the function for outputting the write data area of a chunk from the output of the hash function, in accordance with an embodiment of the present invention.

FIG. 2 is a functional block diagram depicting the relationship between the hash function for determining the storage location of a chunk of data, h2( ), and the function for outputting the write data area of a chunk from the output of the hash function, p( ), in accordance with an embodiment of the present invention.

For the purposes of this description, h1( ) is used to denote a hash function which is used in an existing deduplication algorithm. This hash function is used to output hash values from chunks, and to determine whether two chunks are the same or not. In this embodiment, the hash function, h1( ), is a hash function with a sufficiently low possibility of hash collision, so that different chunks are not determined to be the same. For example, the hash function SHA-1 may be used. The function h2( ) is used to denote a hash function for determining the storage location of a data chunk. A data chunk is taken as an input, as with h1( ). In this embodiment, h2( ) may cause the same output to appear for different chunks, thus a hash function with high speed (though a higher possibility of hash collision than that of h1( ), may be used. For example, mod operation may be used. In this embodiment, h2(i)=i mod U is established, and is given as a function for outputting a value between 0 and U−1. In other embodiments, other functions may be implemented with h2( ), given that output is between 0 to U−1. The function p( ) is a function for outputting the write data area of a chunk from the output (0, . . . , U−1) of the hash function h2( ). The write data area may be a partition in a storage or a directory on a file system, for example.

As depicted in FIG. 2, each data chunk 202 is assumed to be a decimal data containing two digits (e.g., 14, 63, 37, etc.), and function 204 (i.e., h2(i)=i mod 5) and function 206 (i.e., p(h2(i))) are assumed to be functions for outputting a partition called part a. An integer 205 between 0 and 4 is obtained by calculation of function 204 (i.e., the data of each data chunk 202) and this is input to function 206, to determine the write partition 208 of the data chunk 202.

Figure 3:
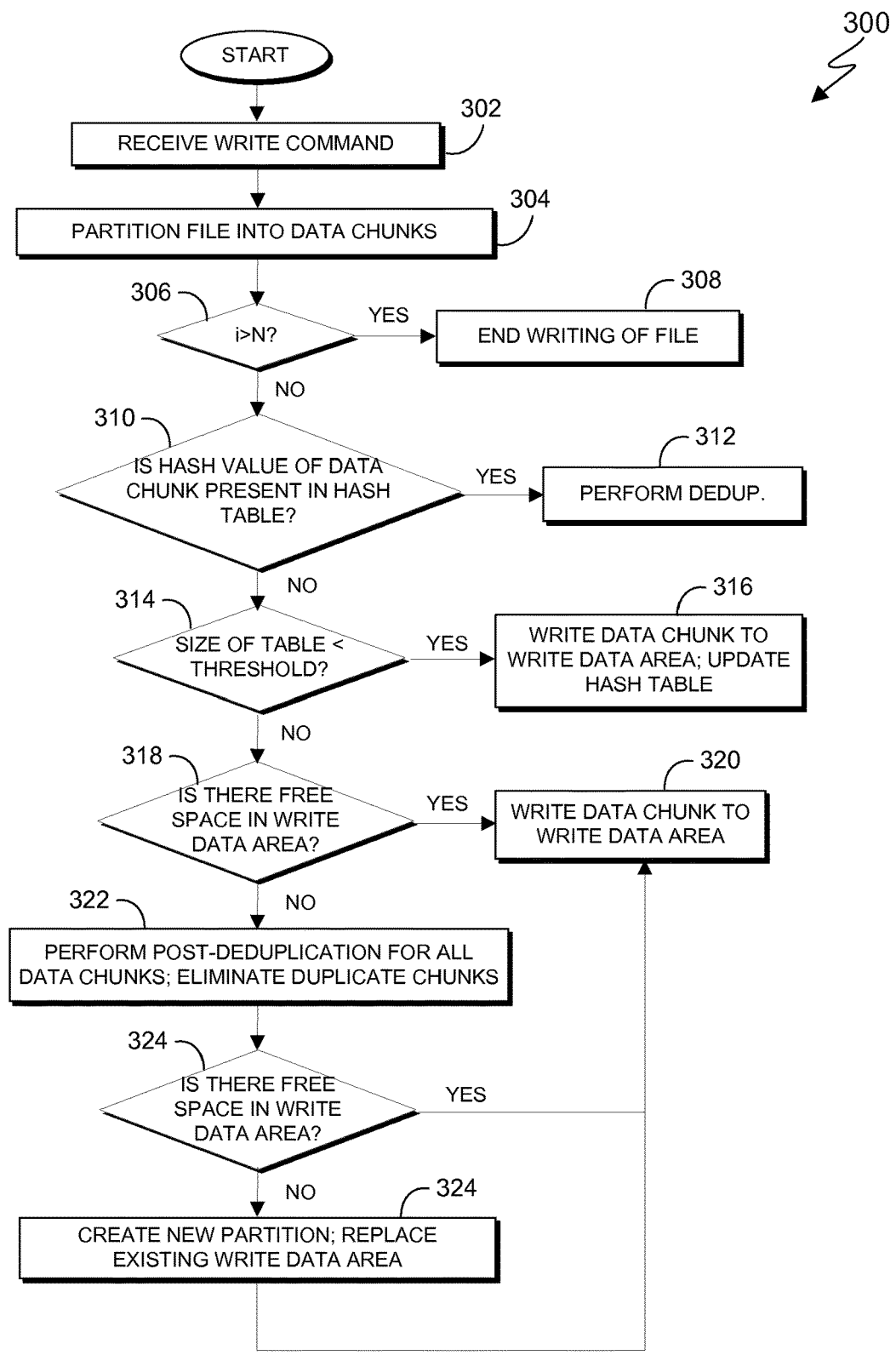
FIG. 3 is a flowchart illustrating operations for performing data deduplication using a limited size hash table and post deduplication, in accordance with an embodiment of the present invention.

FIG. 3 is a flowchart illustrating operations for performing data deduplication and post-deduplication, in accordance with an embodiment of the present invention.

Data deduplication module 114 receives a write command for a particular file, using processes known in the art (operation 302).

Data deduplication module 114 partitions the received file into data chunks (operation 304). In this embodiment, data deduplication module 114 divides the received file into N number of data chunks (i.e., c1, c2, c3, . . . cn).

Data deduplication module 114 determines whether i is greater than N (operation 306). In this embodiment, i is an iterator, and is incremented in each loop of the main process (i.e., operations 310-326). Data deduplication module 114 determines whether there any remaining data chunks from the N number of chunks that have not yet been processed.

If data deduplication module 114 determines that i is greater than n (i.e., there are no data chunks remaining to process), then deduplication module ends the file writing operation (operation 308).

If data deduplication module 114 determines that i is not greater than n (i.e., there are remaining data chunks left to process), then data deduplication module 114 determines whether the hash value of the data chunk is present in the hash table (operation 310). In this embodiment, a hash value is generated for the current data chunk and using the hash function, h1( ), it is determined whether the hash value matches a hash value already present in the hash table (i.e., whether two data chunks are the same). Existing methods are used to compare the hash values, such as comparing the actual data in the data unit to the data associated with the hash value in the table.

If data deduplication module 114 determines that the hash value of the data chunk is present in the hash table, then data deduplication module 114 performs deduplication using existing methods (operation 312). Operation 306 is then repeated for each data chunk, until each data chunk has been processed.

If data deduplication module 114 determines that the hash value of the data chunk is not present in the hash table, then data deduplication module 114 determines whether the size of the hash table is less than the threshold size (operation 314). In this embodiment, the threshold size, T, is the threshold size of a hash table. For example, the threshold size of the hash table may be 50% of the capacity of the mounted memory.

If data deduplication module 114 determines that the size of the hash table is less than the threshold size, then data deduplication module 114 writes that data chunk to a write data area and updates the hash table (operation 316). In this embodiment, if the size of the hash table is less than the threshold, then data deduplication module 114 writes the data chunk to a write data area, such as a partition in the storage, or a directory on a file system, which is identified based on the hash function p(h2(ci)). The operation is performed in the same manner as the original deduplication (i.e., operation 312), until the threshold size of the hash table is exceeded. Operation 306 is then repeated for each data chunk, until each data chunk has been processed.

If data deduplication module 114 determines that the size of the hash table is not less than the threshold size (i.e., size of the hash table has exceeded the threshold size), then data deduplication module 114 determines whether there is free space in the write data area (operation 318). In this embodiment, if the size of the hash table exceeds the threshold size, T, then update of the hash table is not performed, and data deduplication module 114 determines whether there is free space in the write data area.

If data deduplication module 114 determines that there is free space in the write data area, then data deduplication module 114 writes the data chunk to the corresponding write data area (operation 320). In this embodiment, data deduplication module 114 writes the data chunk to a write data area, such as a partition in the storage, or a directory on a file system, which is identified using the function p(h2(ci)), and each data chunk is stored in the corresponding write data area. When this operation is repeated for each of N data chunks (i.e., operation 306), many data chunks which can be deduplicated against one another are stored in each data area.

If data deduplication module 114 determines that there is not free space in the write data area, then data deduplication module 114 performs post-deduplication processing for all of the data chunks in the write data area, and eliminates the duplicate data chunks (operation 322). In this embodiment, data deduplication module 114 performs post-deduplication when free space is not found in the data area specified by the function p(h2(ci). During post-deduplication, data deduplication module 114 performs a deduplication for all of the data chunks in the function (p(h2(ci)) and attempts to create a free space. Specifically, post-deduplication looks into all of the data chunks of the function p(h2(ci) and tries to locate matching chunks, in order to eliminate the duplicate data chunks, in order to free more space. Accordingly, by performing post-deduplication in each data area at certain times, data chunks which can be deduplicated may be efficiently located, and the storage usage rate may be increased, while keeping the hash table as small as possible.

In other embodiments, at the time of processing the post-deduplicated data, a hash table for post-deduplication, different than the hash table which is already loaded into the memory, may be necessary for processing. If this hash table has to be loaded into the memory, but the capacity in the memory for the hash table cannot be secured, then the processing of post-deduplicated data may be performed by loading the hash table into a secondary storage device, while being asynchronous with the writing of the data. In this case, suspending the writing of the post-deduplicated target data to function p becomes necessary, application of the present invention remains possible.

In some embodiments, in the case where a new data chunk, which can be deduplicated, is found during the post-deduplication process, the hash value may be replaced with an arbitrary value in the hash table. At this time, for example, the number of references of data chunks (i.e., the number of times that deduplication has been performed) at the time of deduplication or post-deduplication may be counted, and the hash table may be reconstructed in the descending order of the counted references. In this way, a hash table having hash values with higher possibilities of deduplication may be constructed, based on a rule that if the same data is stored several times, the same data is likely to be stored in the future. This hash table for counting the number of references of chunks may be stored in the memory or in a secondary storage device, as in the case of post-deduplication processing.

Data deduplication module 114 determines whether there is free space in the write data area (operation 324). In this embodiment, data deduplication module 114 determines whether free space has been created in the write data area specified by p(h2(ci)), after the post-deduplication process.

If data deduplication module 114 determines that there is free space in the write data area specified by p(h2(ci)), then data deduplication module 114 writes the data chunk to the corresponding write data area specified by p(h2(ci)) (operation 320).

If data deduplication module 114 determines that there is no free space in the write data area specified by p(h2(ci)), then data deduplication module 114 creates a new partition for the hash function, h2(ci), and replaces the existing function, p(h(ci)) with the new partition (operation 326). After the creation of a new partition for the data chunk, data deduplication module 114 writes the data chunk to the corresponding write data area (operation 320).

In some embodiments, MD5 (a hash function well-known in the art) can be applied to a part of the present invention. In the present invention, the hash function is only a part of the elements, and is not meant to limit the hash function. MD5 may be used for both hash functions used in this invention, i.e., h1( ) and h2( ).

Accordingly, by performing operations of FIG. 3, the deduplication processing time is reduced, as the target chunks of data during post-deduplication are only some of the chunks. The hash table is efficiently used, by keeping information held in the hash table to only information about data chunks which can be deduplicated as much as possible. In addition, in the case where deduplication is to be performed in synchronization with a write command, and where a delay in the write processing is not permitted, the present invention may be more efficient as the hash table is loaded to the main memory of a system, rather than to a slower memory area (such as a secondary memory), as may be the case in other techniques, such as a virtual memory technique.

Figure 4:
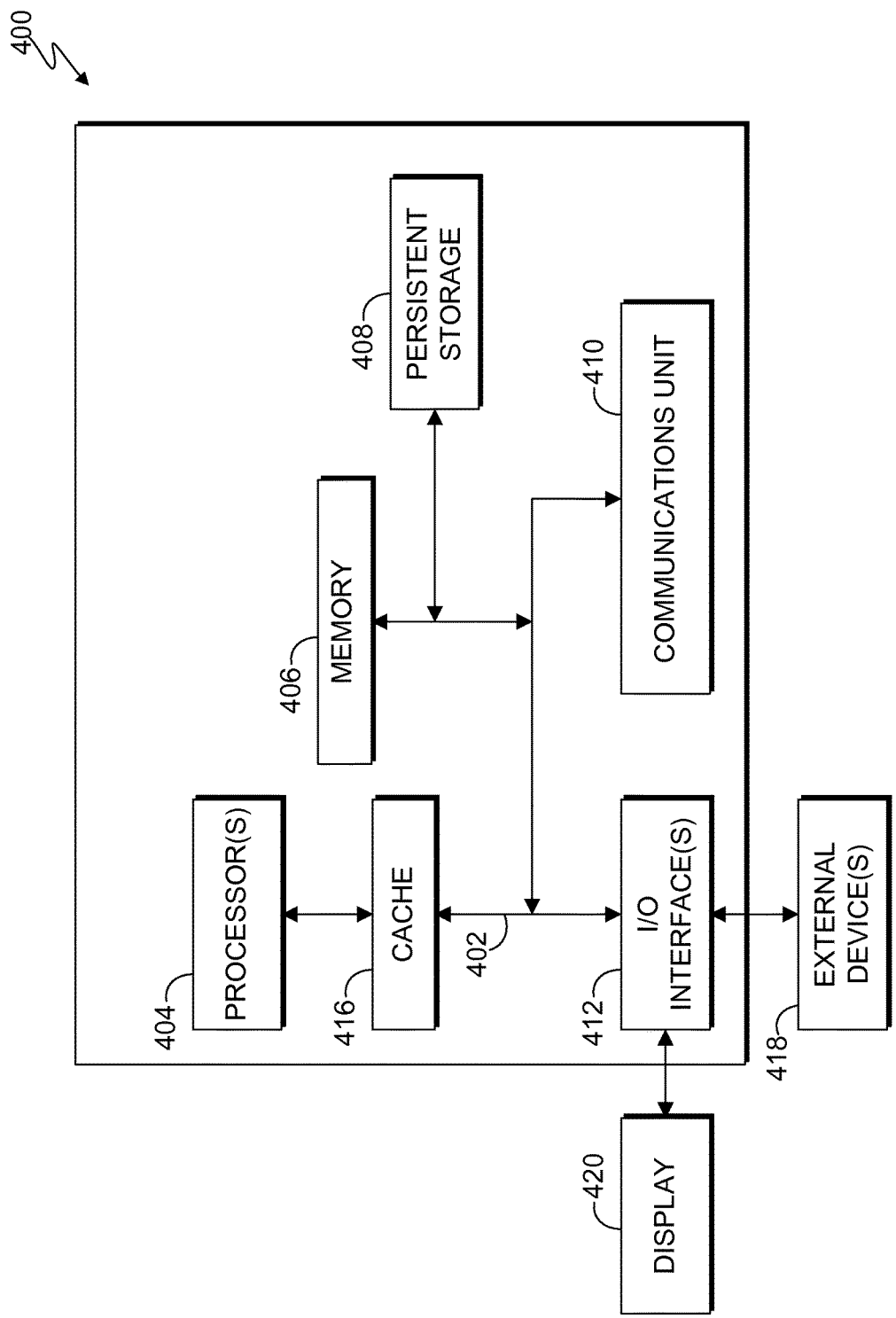
FIG. 4 depicts a block diagram of components of a computing device, in accordance with an embodiment of the present invention.

FIG. 4 is a block diagram of internal and external components of a computing device, generally designated 400, which is representative of the computing device of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Computing device 400 includes communications fabric 402, which provides communications between computer processor(s) 402, memory 406, cache 416, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM). In general, memory 406 can include any suitable volatile or non-volatile computer readable storage media. Cache 416 is a fast memory that enhances the performance of processors 404 by holding recently accessed data, and data near recently accessed data, from memory 406.

Program instructions and data used to practice embodiments of the present invention may be stored in persistent storage 408 and in memory 406 for execution by one or more of the respective processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of a network. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to computing device 400. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention (e.g., software and data) can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for data deduplication comprising:
for a data chunk, determining, by one or more computer processors, whether a hash value of the data chunk generated by a first hash function is present in a hash table;
determining, by one or more computer processors, whether a total capacity of the hash table is above a threshold capacity;
in response to determining that the total capacity of the hash table is above a threshold capacity, determining, by one or more computer processors, whether there is space in a write data area of a system, wherein the write data area is identified by a second hash function, and wherein the hash table is loaded to a main memory of the write data area;
in response to determining that there is not space in the write data area, performing, by one or more computer processors, a post-deduplication process for each data chunk in the write data area, wherein the post-deduplication process identifies and deletes duplicate data chunks in the write data area, frees space in the write data area, and increases a storage usage rate of the deduplicated data chunks; and
in response to determining, upon performing the post-deduplication process, that there is space in the write data area, writing, by one or more computer processors, the data chunk to the write data area identified by the second hash function.

2. The method of claim 1, further comprising:
in response to determining that the hash value of the data chunk is present in a hash table, performing, by one or more computer processors, data deduplication of the data chunk.

3. The method of claim 1, further comprising:
in response to determining that the total capacity of the hash table is not above a threshold capacity, writing, by one or more computer processors, a second data chunk to the write data area identified by the second hash function; and
updating, by one or more computer processors, the hash table with information associated with the written second data chunk.

4. The method of claim 1, further comprising:
determining, by one or more processors, after performing the post-deduplication process for each data chunk in the write data area, whether there is space in the write data area;
in response to determining that there is not space in the write data area, creating, by one or more computer processors, a new partition for the second hash function; and
replacing, by one or more computer processors, an existing function with a new function for the second hash function.

5. The method of claim 1, further comprising:
identifying, by one or more computer processors, during the post-deduplication process, a new data chunk;
replacing, by one or more computer processors, a hash value of the new data chunk with a new hash value, in the hash table;

determining, by one or more computer processors, a reference value of the new data chunk, wherein the reference value comprises a number of times that deduplication is performed on the new data chunk; and
ordering, by one or more computer processors, the hash table, wherein an order of the hash table is based on the reference value of the new data chunk.

6. A computer program product for data deduplication comprising:
a computer readable storage medium and program instructions stored on the computer readable storage medium, the program instructions comprising:
for a data chunk, program instructions to determine whether a hash value of the data chunk generated by a first hash function is present in a hash table;
program instructions to in response to determining that the total capacity of the hash table is above a threshold capacity, determine, by one or more computer processors, whether there is space in a write data area of a system, wherein the write data area is identified by a second hash function, and wherein the hash table is loaded to a main memory of the write data area;
program instructions to in response to determining that there is not space in the write data area, perform, by one or more computer processors, a post-deduplication process for each data chunk in the write data area, wherein the post-deduplication process identifies and deletes duplicate data chunks in the write data area, frees space in the write data area, and increases a storage usage rate of the deduplicated data chunks; and
program instructions to, in response to determining, upon performing the post-deduplication process, that there is space in the write data area, write, by one or more computer processors, the data chunk to the write data area identified by the second hash function.

7. The computer program product of claim 6, further comprising:
program instructions to, in response to determining that the hash value of the data chunk is present in a hash table, perform data deduplication of the data chunk.

8. The computer program product of claim 6, further comprising:
program instructions to, in response to determining that the total capacity of the hash table is not above a threshold capacity, writing, by one or more computer processors, a second data chunk to the write data area identified by the second hash function; and
program instructions to update the hash table with information associated with the written second data chunk.

9. The computer program product of claim 6, further comprising:
program instructions to determine, after performing the post-deduplication process for each data chunk in the write data area, whether there is space in the write data area;
program instructions to, in response to determining that there is not space in the write data area, creating, by one or more computer processors, a new partition for the second hash function; and
program instructions to replace an existing function with a new function for the second hash function.

10. The computer program product of claim 6, further comprising:
program instructions to identify, during the post-deduplication process, a new data chunk;
program instructions to replace a hash value of the new data chunk with a new hash value, in the hash table;

program instructions to determine a reference value of the new data chunk, wherein the reference value comprises a number of times that deduplication is performed on the new data chunk; and program instructions to order the hash table, wherein an order of the hash table is based on the reference value of the new data chunk.

11. A computer system for data deduplication, the computer system comprising:

one or more computer processors;

one or more computer readable storage media;

for a data chunk, program instructions to determine whether a hash value of the data chunk generated by a first hash function is present in a hash table;

for a data chunk, program instructions to determine whether a hash value of the data chunk generated by a first hash function is present in a hash table;

program instructions to in response to determining that the total capacity of the hash table is above a threshold capacity, determine, by one or more computer processors, whether there is space in a write data area of a system, wherein the write data area is identified by a second hash function, and wherein the hash table is loaded to a main memory of the write data area;

program instructions to in response to determining that there is not space in the write data area, perform, by one or more computer processors, a post-deduplication process for each data chunk in the write data area, wherein the post-deduplication process identifies and deletes duplicate data chunks in the write data area, frees space in the write data area, and increases a storage usage rate of the deduplicated data chunks; and program instructions to in response to determining, upon performing the post-deduplication process, that there is space in the write data area, write, by one or more computer processors, the data chunk to the write data area identified by the second hash function.

12. The computer system of claim 11, further comprising:

program instructions to, in response to determining that the hash value of the data chunk is present in a hash table, perform data deduplication of the data chunk.

13. The computer system of claim 11, further comprising:

program instructions to, in response to determining that the total capacity of the hash table is not above a threshold capacity, writing, by one or more computer processors, a second data chunk to the write data area identified by the second hash function; and program instructions to update the hash table with information associated with the written second data chunk.

14. The computer system of claim 11, further comprising:

program instructions to determine, after performing the post-deduplication process for each data chunk in the write data area, whether there is space in the write data area;

program instructions to, in response to determining that there is not space in the write data area, creating, by one or more computer processors, a new partition for the second hash function; and program instructions to replace an existing function with a new function for the second hash function.

15. The computer system of claim 11, further comprising:

program instructions to identify, during the post-deduplication process, a new data chunk;

program instructions to replace a hash value of the new data chunk with a new hash value, in the hash table;

program instructions to determine a reference value of the new data chunk, wherein the reference value comprises a number of times that deduplication is performed on the new data chunk; and program instructions to order the hash table, wherein an order of the hash table is based on the reference value of the new data chunk.

* * * * *